United States Patent
Kim et al.

(10) Patent No.: US 10,980,077 B2
(45) Date of Patent: Apr. 13, 2021

(54) METHOD FOR PERFORMING MCG RECOVERY IN DUAL CONNECTIVITY IN WIRELESS COMMUNICATION SYSTEM AND A DEVICE THEREFOR

(71) Applicant: LG Electronics Inc., Seoul (KR)

(72) Inventors: Hongsuk Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/499,500

(22) PCT Filed: Mar. 22, 2018

(86) PCT No.: PCT/KR2018/003327
§ 371 (c)(1),
(2) Date: Sep. 30, 2019

(87) PCT Pub. No.: WO2018/182231
PCT Pub. Date: Oct. 4, 2018

(65) Prior Publication Data
US 2020/0045764 A1    Feb. 6, 2020

Related U.S. Application Data

(60) Provisional application No. 62/480,363, filed on Apr. 1, 2017.

(51) Int. Cl.
*H04W 76/19* (2018.01)
*H04W 76/15* (2018.01)
(Continued)

(52) U.S. Cl.
CPC ........... *H04W 76/19* (2018.02); *H04L 5/0007* (2013.01); *H04W 36/0027* (2013.01);
(Continued)

(58) Field of Classification Search
CPC ..... H04W 76/19; H04W 76/15; H04W 76/27; H04W 36/305; H04W 36/0027; H04W 36/18; H04L 5/0007
(Continued)

(56) References Cited

U.S. PATENT DOCUMENTS

2014/0086112 A1*  3/2014  Stern-Berkowitz ..........................
                                                H04L 1/1822
                                                370/280
2015/0117183 A1*  4/2015  Heo ........................ H04W 4/90
                                                370/228
(Continued)

FOREIGN PATENT DOCUMENTS

KR    1020140120807 A    10/2014
WO      2015140038 A1     9/2015

OTHER PUBLICATIONS

R2-1701438: 3GPP TSG-RAN WG2 Meeting #97, Athens, Greece, Feb. 13-17, 2017, "RRC connection Re-establishment for control plane," Huawei, HiSilicon, Neul Limited, pp. 1-18.

(Continued)

*Primary Examiner* — Christopher R Crompton
(74) *Attorney, Agent, or Firm* — Dentons US LLP

(57) ABSTRACT

The present invention relates to a wireless communication system. More specifically, the present invention relates to a method and a device for performing MCG recovery in dual connectivity in wireless communication system, the method comprising: detecting radio link failure on a master node, wherein the UE is configured with the master node and a secondary node simultaneously; and suspending all secondary cells of the secondary node during the RRC connection re-establishment procedure, and transmitting an indicator indicating the suspension of secondary cells of the second- (Continued)

ary node without releasing the secondary cells if the selected cell is one of cells belonging to a cell list.

14 Claims, 13 Drawing Sheets

(51) Int. Cl.
 *H04W 76/27*   (2018.01)
 *H04W 36/30*   (2009.01)
 *H04L 5/00*   (2006.01)
 *H04W 36/00*   (2009.01)
 *H04W 36/18*   (2009.01)

(52) U.S. Cl.
 CPC ......... *H04W 36/18* (2013.01); *H04W 36/305* (2018.08); *H04W 76/15* (2018.02); *H04W 76/27* (2018.02)

(58) Field of Classification Search
 USPC ........................................................ 370/331
 See application file for complete search history.

(56) References Cited

U.S. PATENT DOCUMENTS

| | | | |
|---|---|---|---|
| 2016/0095004 A1* | 3/2016 | Tseng | H04W 76/15 370/228 |
| 2018/0270698 A1* | 9/2018 | Babaei | H04W 28/0278 |
| 2018/0270792 A1* | 9/2018 | Park | H04W 76/28 |
| 2018/0270894 A1* | 9/2018 | Park | H04W 76/27 |
| 2019/0356460 A1* | 11/2019 | Tsuboi | H04W 48/16 |
| 2020/0068437 A1* | 2/2020 | Lohr | H04L 1/1874 |

OTHER PUBLICATIONS

R2-1701634: 3GPP TSG-RAN WG2 #97, Athens, Greece, Feb. 13-17, 2017, "Supplementary SRB in MCG failure for LTE-NR interworking," LG Electronics Inc., pp. 1-3.

* cited by examiner

【Figure 1】
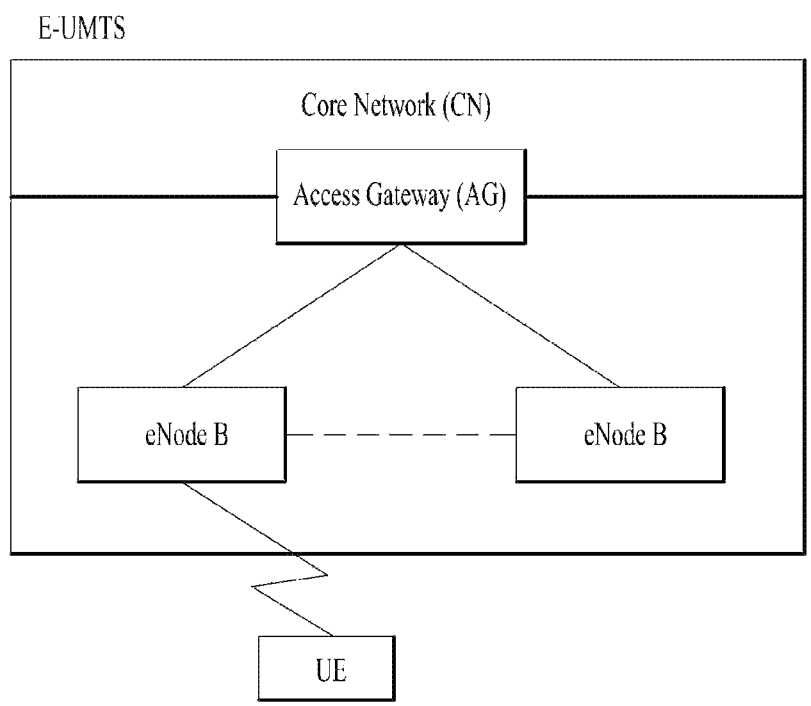

[Figure 2a]
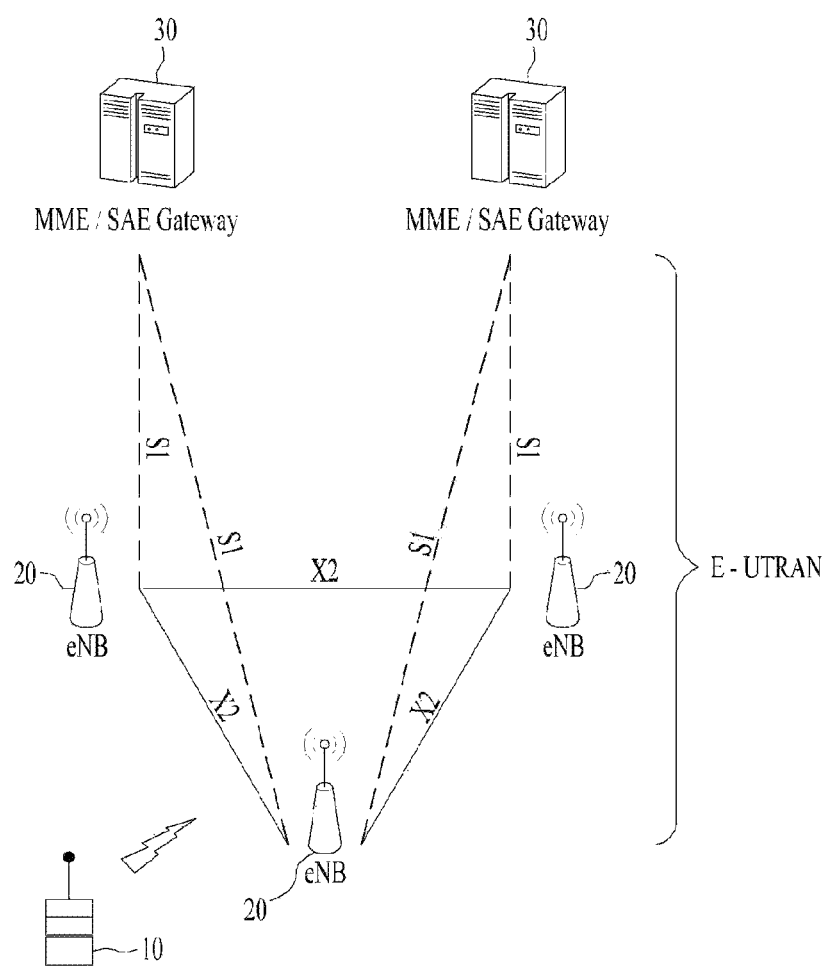

[Figure 2b]
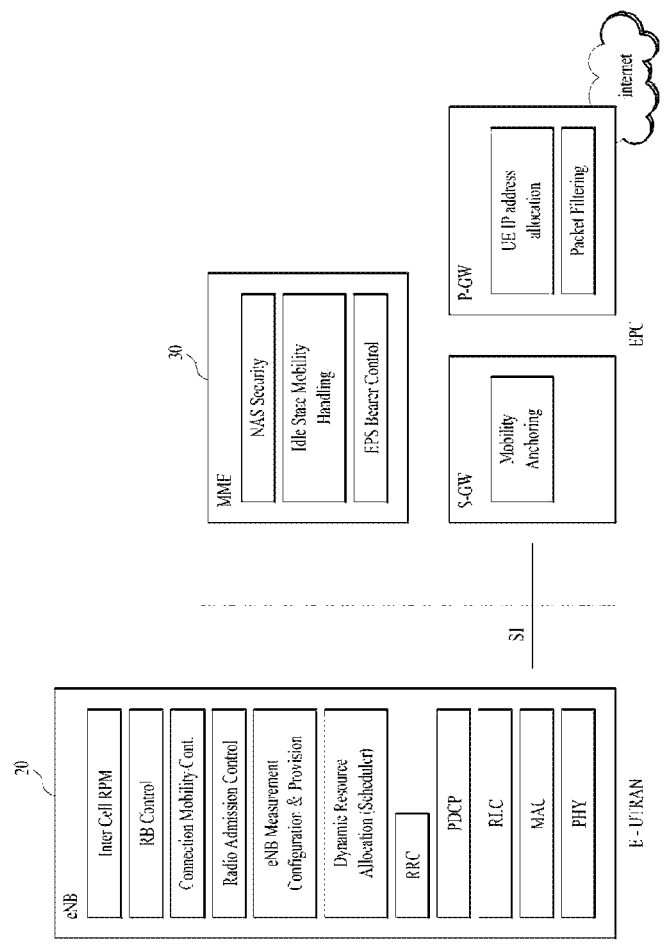

[Figure 3]
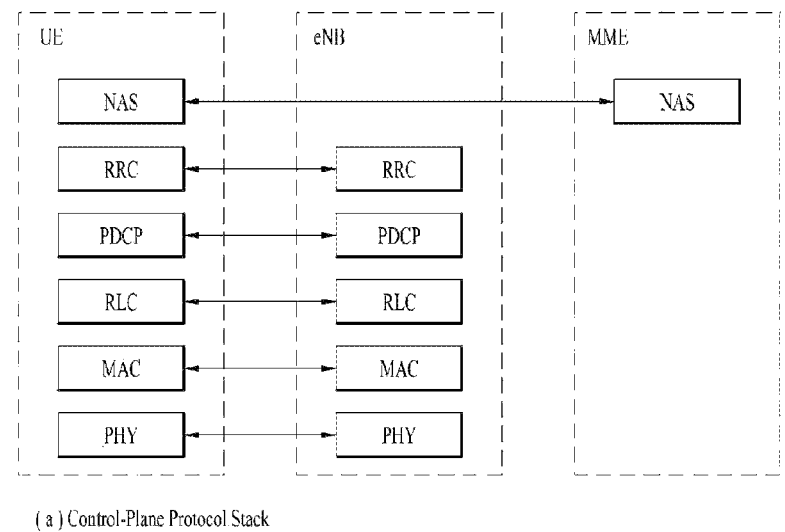
(a) Control-Plane Protocol Stack
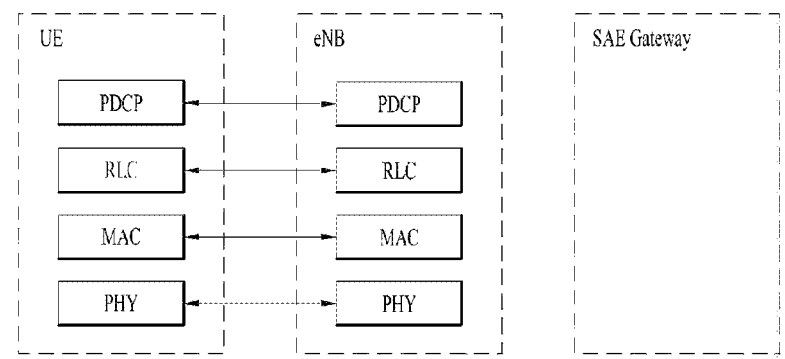
(b) User-Plane Protocol Stack

[Figure 4a]
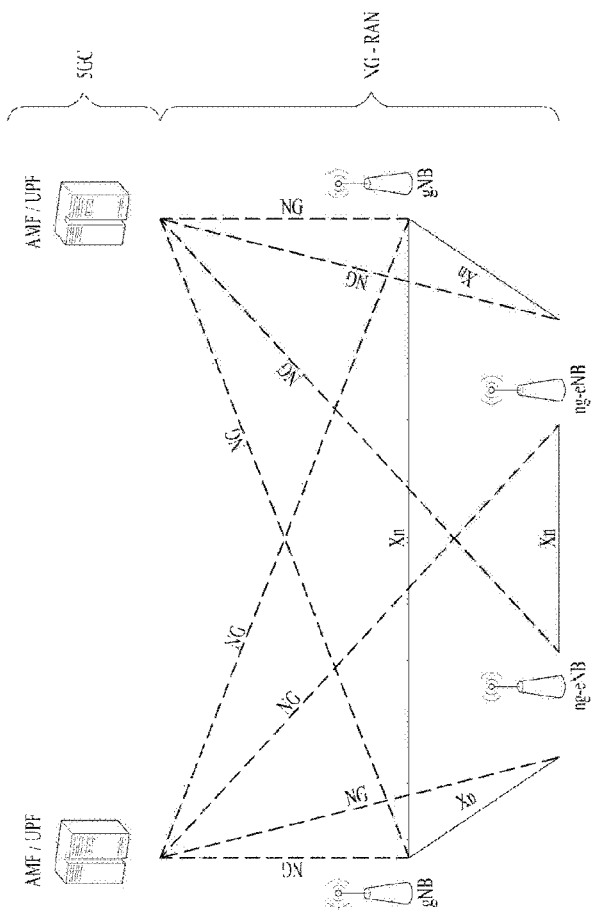

[Figure 4b]
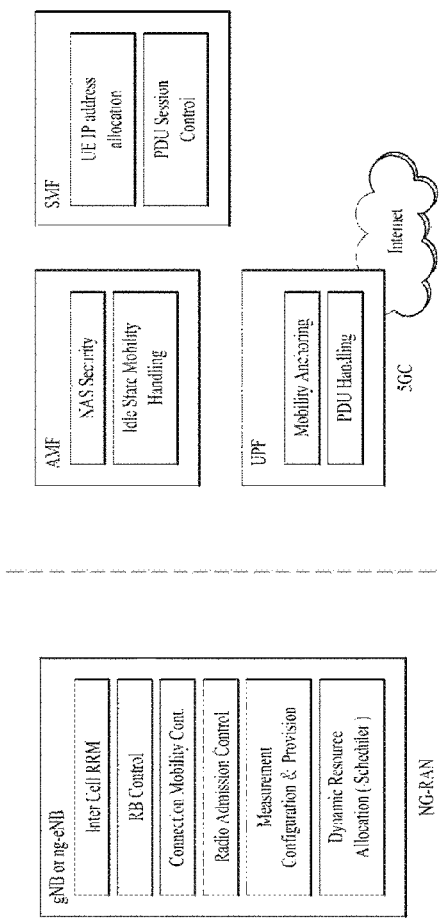

[Figure 5]
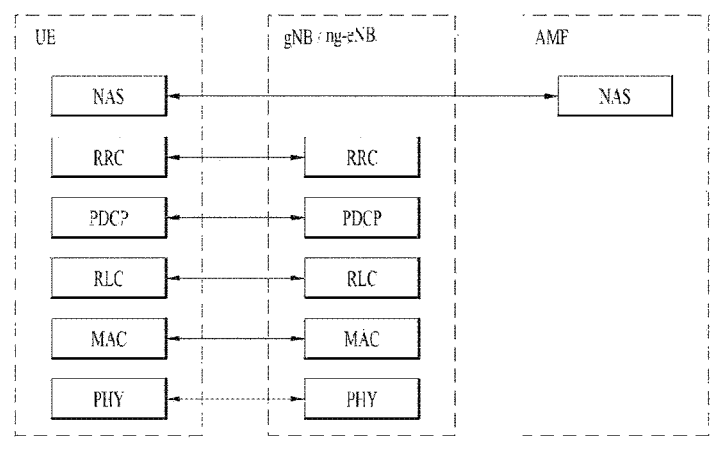
(a) Control-Plane Protocol Stack
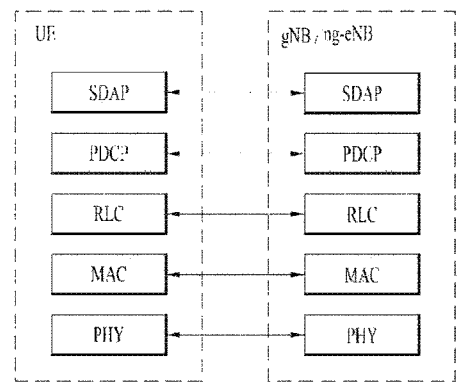
(b) User-Plane Protocol Stack 【Figure 6a】
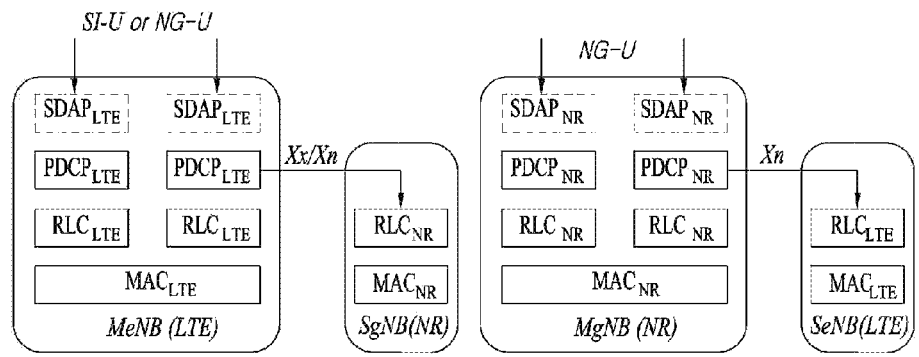
【Figure 6b】
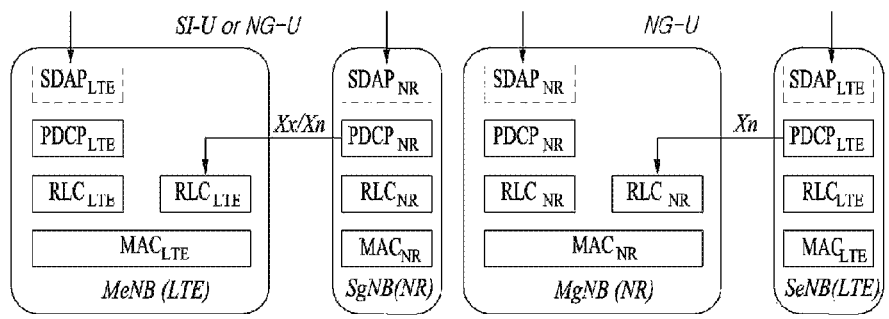

[Figure 6c]
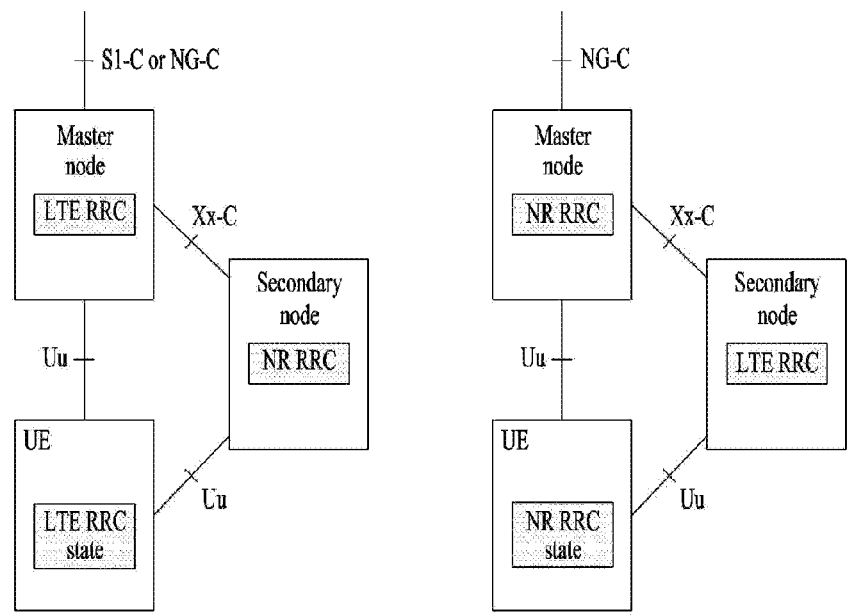
[Figure 7]
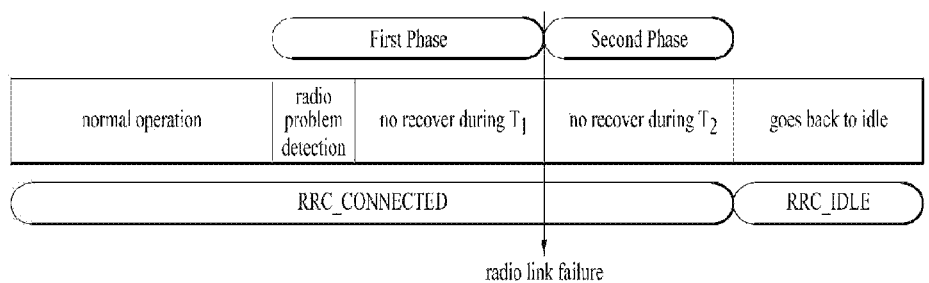

[Figure 8]
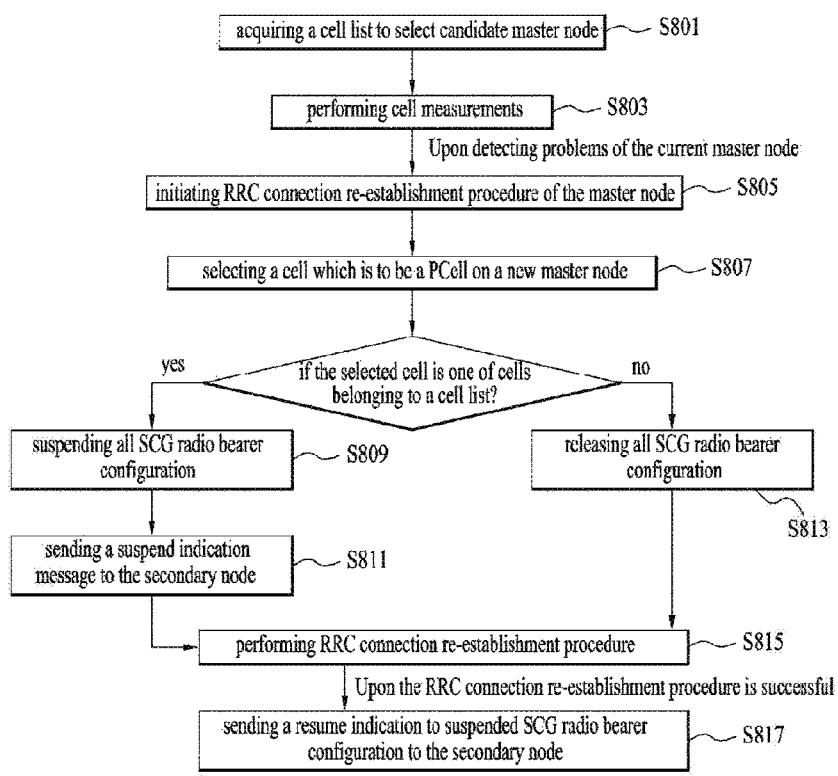

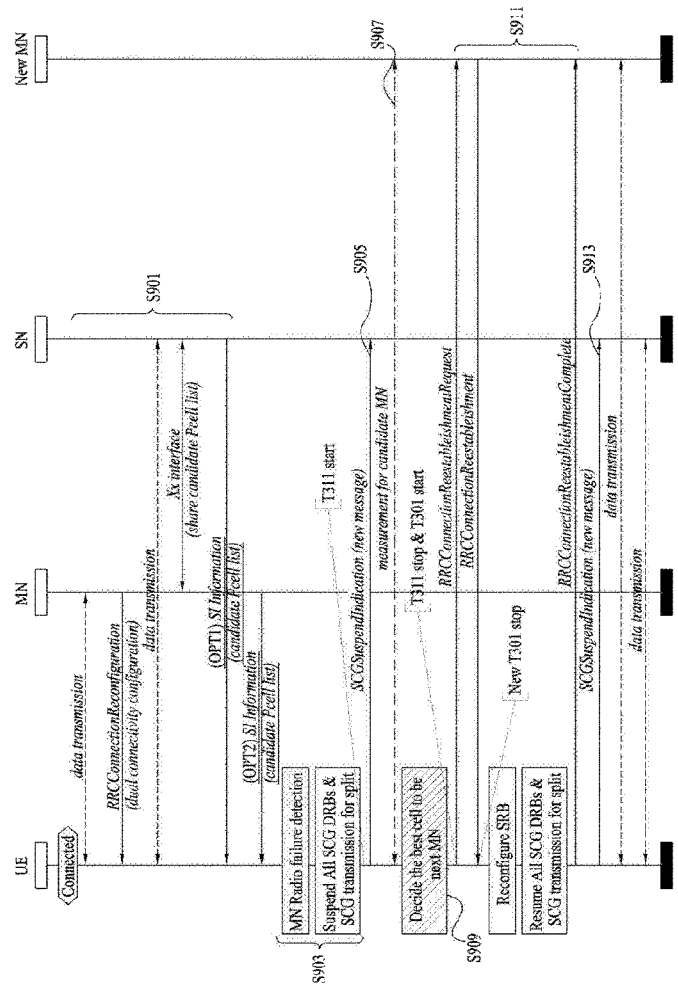
[Figure 9]

[Figure 10]
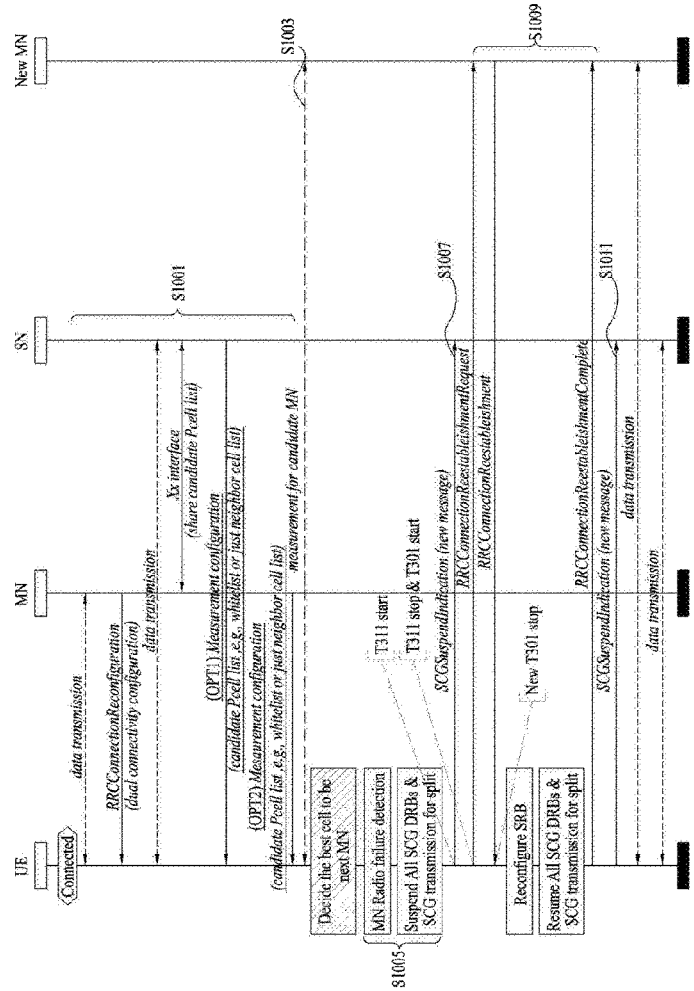

[Figure 11]
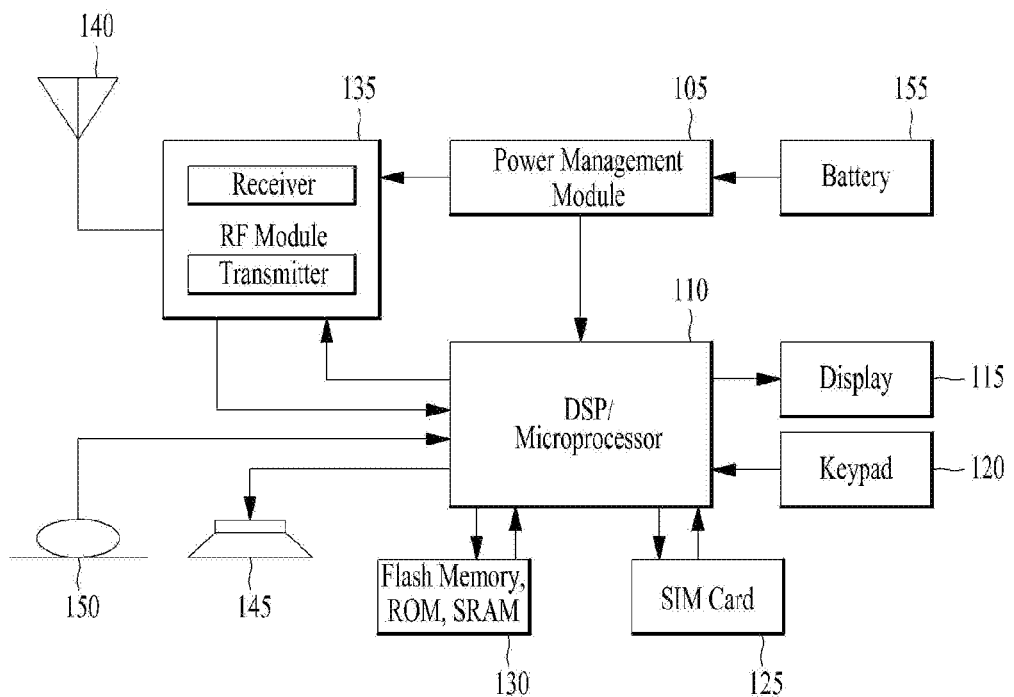

METHOD FOR PERFORMING MCG RECOVERY IN DUAL CONNECTIVITY IN WIRELESS COMMUNICATION SYSTEM AND A DEVICE THEREFOR

This application is the National Stage filing under 35 U.S.C. 371 of International Application No. PCT/KR2018/003327, filed on Mar. 22, 2018, which claims the benefit of U.S. Provisional Application No. 62/480,363, filed on Apr. 1, 2017, the contents of which are all hereby incorporated by reference herein in their entirety.

TECHNICAL FIELD

The present invention relates to a wireless communication system and, more particularly, to a method for performing MCG recovery in dual connectivity in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing MCG recovery in dual connectivity in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of methods suspension SCG upon detecting radio link failure on MCG without releasing SCG bearer configuration. If there is a better way to keep SCG bearer configuration even in case of radio problems on master node, the UE and the network have improvement to keep data throughput with low latency and signaling cost.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6a is a diagram showing a split bearer via MCG for Dual Connectivity between LTE and NR, FIG. 6b is a diagram showing a split bearer via SCG for Dual Connectivity between LTE and NR, and FIG. 6c is an architecture showing control plane for Dual Connectivity between LTE and NR;

FIG. 7 is an example for radio link failure operation in LTE;

FIG. 8 is a conceptual diagram for performing recovery from radio link failure of a master node in dual connectivity in wireless communication system according to embodiments of the present invention;

FIGS. 9 and 10 are examples for performing recovery from radio link failure of a master node in dual connectivity in wireless communication system according to embodiments of the present invention; and FIG. 11 is a block diagram of a communication apparatus according to an embodiment of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6a is a diagram showing a split bearer via Master Cell Group (MCG) for Dual Connectivity between LTE and New Rat (NR), FIG. 6b is a diagram showing a split bearer via SCG for Dual Connectivity between LTE and NR, and FIG. 6c is an architecture showing control plane for Dual Connectivity between LTE and NR.

In DC, the configured set of serving cells for a UE consists of two subsets: the Master Cell Group (MCG) containing the serving cells of the MeNB, and the Secondary Cell Group (SCG) containing the serving cells of the SeNB.

When a UE is configured with CA in the MCG, the same principles as a legacy Carrier Aggregation. For SCG, the following principles are applied: i) at least one cell in SCG has a configured UL CC and one of them, named Primary SCell (PSCell), is configured with PUCCH resources; ii) when SCG is configured, there is always at least one SCG bearer or one Split bearer; iii) Upon detection of a physical layer problem or a random access problem on PSCell, or the maximum number of RLC retransmissions has been reached associated with the SCG, or upon detection of an access problem on PSCell (T307 expiry) during SCG change, or when exceeding the maximum transmission timing difference between CGs.

For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention based Random Access.

In DC between LTE and NR, the secondary node owns its radio resources and is primary responsible for allocating radio resources of it cells. To enable this, some coordination is required between the master node and the secondary node no matter whether the master RAT is LTE and the secondary RAT is NR, or vice versa.

The following RRC functions are at least relevant when (re)configuring secondary node cells to the UE in coordination with the master node; i) common radio resource configurations on secondary node cells, ii) dedicated radio resource configurations on secondary node cells; and iii) measurement and mobility control for secondary node cells.

When DC between LTE and NR is configured for a UE, the UE has a single RRC state machine based on the master node RAT. In this operation, single control plane connection is established towards CN. With these principles, FIG. 6(c) illustrates the control plane architectures for DC between LTE and NR. Each node has its own RRC entity which can generate RRC PDUs and inter-node PDUs using ASN.1. RRC PDUs and inter-node PDUs generated by the secondary node are embedded with RRC PDUs generated by the master node which are transported via the master node to the UE for the first configuration, and for the secondary node RRC reconfiguration requiring the master node RRC reconfiguration and vice versa. The master node needs not to modify or add the UE configurations for the secondary node.

The UE can be configured to establish an SRB in Secondary Cell Group (SCG) to enable RRC Protocol Data Units (PDUs) for the secondary node to be sent directly between the UE and the secondary node. RRC PDUs for the secondary node can be transported directly to the UE for the secondary node RRC reconfiguration not requiring any coordination with the master node. Alternatively, it can be delivered embedded within RRC PDUs generated by the master node, which is up to the network implementation. Measurement reporting for mobility within the secondary node can be done directly from the UE to the secondary node if an SCG SRB is configured. Detail rules for the UE to select the transmission path for a UL RRC message are to be defined in the normative work. Support of the direct RRC PDU transmission between the UE and the secondary node does not imply that the UE has to do any reordering of RRC messages.

Split SRB is supported for DC between LTE and NR no matter which RAT is the master. In other words, C-plane packet duplication is supported in LTE/NR PDCP.

For a UE supporting both LTE and NR, the UE reports its capability information for both LTE and NR respectively, which are independent with each other. In other words, a node of one RAT needs not to look at and not to use the capabilities of the other RAT. In case where the secondary node is NR, gNB can format NR RRC PDUs for the UE configuration. Nonetheless, this principle does not preclude that the capabilities of one RAT might contain some information related to the other RAT, e.g. at least inter-RAT measurement capabilities.

In addition, if the UE supports DC between LTE and NR, the following principles are additionally taken into account:
1. LTE capability changes;
   include information related to inter-RAT measurements for NR.
   include support of DC between LTE and NR.
2. NR capability reporting supports independent capability reporting in accordance with the principle described in this sub-clause.
3. Capability dependency between LTE and NR.
   Type I capabilities: The use of the capability is isolated to the RAT.
   Type II capabilities: The use of the capability in one RAT has impacts to the other RAT but is not understood by the NW side of the other RAT.
   Type III capabilities: The use of the capability in one RAT has impacts to the other RAT and is understood by the NW side of the other RAT.

For Type I capabilities, no coordination between LTE and NR is required. The secondary RAT specific capabilities are merely forwarded by the master node to the secondary node, following the baseline DC within LTE. Some capabilities (e.g. RF capability) are coordinated using Xx/Xn and involve a reconfiguration of the UE. The configuration of the UE does not exceed its capabilities. Some capabilities (e.g. buffer size) are coordinated using Xx/Xn and will not involve a reconfiguration of the UE. In this case, the ongoing operation of the network does not exceed the UE capabilities.

For the UE capabilities requiring coordination between LTE and NR, only two nodes (i.e. one eNB and one gNB) need to be involved. Nevertheless, the forward compatibility towards multiple node connectivity can be considered as well. It is up to the master node to decide on how to resolve the dependency between LTE and NR. The secondary node can initiate the re-negotiation of the UE capability. Upon receiving the re-negotiation request from the secondary node, it is up to the master node to make the final decision.

For DC between LTE and NR where MCG comprises LTE cell(s) and SCG comprises NR cell(s), the gNB as the secondary node is not required to broadcast system information other than for radio frame timing and SFN. In this case, system information (for initial configuration) is provided for the UE by dedicated RRC signaling via LTE eNB as the master node. The UE acquires, at least, radio frame timing and SFN of SCG from the NR-PSS/SSS and PBCH of NR Primary SCell (PSCell).

For DC between LTE and NR where MCG comprises NR cell(s) and SCG comprises LTE cell(s), system information (for initial configuration) is provided for the UE by dedicated RRC signaling via NR gNB as the master node. In this case, the UE acquires radio frame timing and SFN of SCG from PSS/SSS and MIB on LTE PSCell.

FIG. 7 is an example for radio link failure operation in LTE.

Two phases govern the behavior associated to radio link failure as shown on FIG. 8

The first phase includes that: i) started upon radio problem detection; ii) leads to radio link failure detection; iii) no UE-based mobility; iv) based on timer or other (e.g. counting) criteria (T1).

The second phase includes that: i) started upon radio link failure detection or handover failure; ii) leads to RRC_IDLE; iii) UE-based mobility; and iv) timer based (T2).

In RRC_CONNECTED, the UE considers radio link failure to be detected for the MCG (i.e. RLF) when one of the following criteria are met: i) expiry of a timer (e.g. T310) started after indication of radio problems from the physical layer (if radio problems are recovered before the timer is expired, the UE stops the timer); ii) Random access procedure failure; or iii) RLC failure.

And the UE considers radio link failure to be detected for the SCG i.e. SCG-RLF, and initiate the SCG failure information procedure when one of the following criteria are met: i) expiry of a timer (e.g. T313) started after indication of radio problems from the physical layer (if radio problems are recovered before the timer is expired, the UE stops the timer); ii) upon random access problem indication from SCG MAC; or iii) upon indication from SCG RLC that the maximum number of retransmissions has been reached for an SCG or split DRB.

After RLF on the MCG is declared, the UE stays in RRC_CONNECTED, ii) selects a suitable cell and then initiates RRC re-establishment, and iii) enters RRC_IDLE if a suitable cell wasn't found within a certain time after RLF was declared.

Upon initiation of the RRC re-establishment, the UE suspends all RBs except SRB0, resets MCG MAC, release the MCG SCells, and release the entire SCG configuration.

For DC, the first phase of the radio link failure procedure is supported for PSCell. However, upon detecting RLF on the PSCell, the re-establishment procedure is not triggered at the end of the first phase. Instead, UE shall inform the radio link failure of PSCell to the MeNB.

In DC between LTE and NR, it was agreed that secondary node RRC messages can be transported directly to the UE for secondary node RRC reconfigurations not requiring any coordination with master node and the measurement configuration used by the UE the intra secondary node mobility should be managed by the secondary node. Following the recent agreements in DC between LTE and NR, SCG change and the other suggestions for better function are seriously considered the minimum intervention of master node. As mentioned above, when master node has radio problems, UE should performs RRC Connection Re-establishment for master node and release all secondary node radio bearers.

However, if the secondary node can transmit/receive RRC message itself without master node intervention, there may be a better way to keep secondary node radio bearer configuration even in case of radio problems on master node under certain conditions.

FIG. 8 is a conceptual diagram for performing recovery from radio link failure of a master node in dual connectivity in wireless communication system according to embodiments of the present invention.

It is assumed that a UE is configured with LTE as master node and the NG-RAN as secondary node (i.e. EN-DC), measurement configuration can be provided by SRB of a master node or by SRB of a secondary node, and a master node and a secondary node provide each other some list of candidate nodes to keep the EN-DC configuration.

The UE acquires a cell list to select candidate master node via two options (S801).

Preferably, the cell list includes one or more candidate cells which are to be potential master node. Especially, the cell list includes cell information that can support same SCG configuration as SCG configuration of the master node on which the radio link failure is detected.

Here, the two options are i) the cell list is delivered by system information by master node or secondary node. In this case, the cell list is broadcasted or on-demand dedicated information. And ii) the cell list is delivered by dedicated RRC configuration by master node or secondary node. In this case, the cell list is measurement configuration like white cell list or neighbour cell list.

The UE performs cell measurements with the cell list and figure out which cell is the best candidate to become potential master node (S803).

And if the UE detects problems of the current master node, the UE initiates RRC connection re-establishment procedure for recovery from the radio link failure of the master node (S805).

In RRC_CONNECTED, the UE considers radio link failure to be detected for the MCG (i.e. RLF) when one of the following criteria are met: i) expiry of a timer (e.g. T310) started after indication of radio problems from the physical layer (if radio problems are recovered before the timer is expired, the UE stops the timer); ii) Random access procedure failure; or iii) RLC failure.

When the UE initiates RRC connection re-establishment procedure, the UE selects a cell which is to be a PCell on a new master node (S807).

If the selected cell is one of cells belonging to a cell list, the UE suspends all SCG radio bearer configuration (e.g. all SCG DRBs and suspends SCG transmission for split DRBs except SCG SRB0) without releasing SGC radio bearer configuration (S809), and the UE sends a suspend indication message to the secondary node (S811).

If else, the UE releases all SCG radio bearer configuration of the secondary node (S813).

During RRC connection re-establishment procedure, when the UE selects one of cells belonging the cell list which is received already and includes one or more candidate cells which are to be potential master node, the UE doesn't need to release SCG configuration since the new cell which is to be master node can support same SCG configuration currently.

When the UE selects a cell, the UE performs RRC connection re-establishment procedure (S815). The RRC connection re-establishment performed by the UE and network (e.g. S815) is then performed applies legacy procedure.

The step of S815 include that the UE starts T311 timer for RRC Connection Re-establishment on MCG, and in the RRC Connection Re-establishment on MCG, the UE reconfigure SRB1 to sends RRC Connection Re-establishment Request message to the selected cell (e.g. the neighbour cell). If the UE successfully sends the RRC Connection Re-establishment Request, the UE stops the T311 timer and UE start T301 timer. The UE receives RRC Connection Re-establishment message from the selected cell.

After configuration following the message, that is, after RRC connection reestablishment on the selected cell is successfully completed, the UE sends RRC Connection Re-establishment complete message and also sends resume indication to suspended SCG for resuming all SCG DRBs and SCG transmission for split to the secondary node (S817).

If the UE successfully receives the RRC Connection Re-establishment, the UE stops the T301 timer for RRC Connection Re-establishment on MCG. If the T301 is expired before receiving the RRC Connection Re-establishment, UE may select another candidate cell.

FIGS. 9 and 10 are examples for performing recovery from radio link failure of a master node in dual connectivity in wireless communication system according to embodiments of the present invention.

FIG. 9 shows an example for the cell list delivered by system information.

When the UE is configured with LTE as master node and the NG-RAN as secondary node, the UE acquires explicitly or implicitly a cell list to select candidate master node with on-demand or broadcast system information from mastery node or secondary node (S901).

Upon detection of MCG radio problems, the UE suspends all SCG DRBs and suspends SCG transmission for split DRBs except SCG SRB0 (S903) and the UE sends a suspend indication message to the secondary node without releasing radio bearer configuration (S905).

The UE performs cell measurements for new master cell with the given candidate list of cell, and the UE figures out which cell is the best candidate to be master cell through the result of cell measurements (S907). The cell measurement is performed before or after detection of MCG radio problems.

The UE starts T311 timer for RRC Connection Re-establishment on MCG, and the UE performs cell selection or cell reselection and so (re-)selects a cell for MCG recovery in the RRC Connection Re-establishment on MCG. The UE may directly select the neighbour cell. The cell is one of the candidate cell lists and becomes a new master node (S909).

In the RRC Connection Re-establishment on MCG, UE reconfigure SRB1 to sends RRC Connection Re-establishment Request message to the selected cell (e.g. the neighbour cell), and if the UE successfully sends the RRC Connection Re-establishment Request, the UE stops the T311 timer and UE start T301 timer. The UE receives RRC Connection Re-establishment message from the selected cell. After configuration following the message, the UE sends complete message (S911) and also sends resume indication to suspended SCG for resuming all SCG DRBs and SCG transmission for split (S913).

If the UE successfully receives the RRC Connection Re-establishment, UE stops the T301 timer for RRC Connection Re-establishment on MCG.

FIG. 10 shows an example for the cell list delivered by measurement configuration.

When the UE is configured with LTE as master node and the NG-RAN as secondary node, the UE acquires explicitly or implicitly a cell list to select candidate master node with RRC dedicated signal messages from mastery node or secondary node (S1001). Especially the RRC dedicated signal messages might include measurement configuration like whitelist for master cell candidates.

The UE performs cell measurements for new master cell with the given candidate list of cell, and the UE figures out which cell is the best candidate to be master cell through the result of cell measurements (S1003). The cell measurement is performed before or after detection of MCG radio problems.

Upon detection of MCG radio problems, The UE suspends all SCG DRBs and suspends SCG transmission for split DRBs except SCG SRB0 (S1005) and the UE sends a suspend indication message to the secondary node without releasing radio bearer configuration (S1007).

The UE starts T311 timer for RRC Connection Re-establishment on MCG, and the UE performs cell selection or cell reselection and so (re-)selects a cell for MCG recovery in the RRC Connection Re-establishment on MCG. The UE may directly select the neighbour cell. The cell is one of the candidate cell lists and becomes a new master node (S1009).

In the RRC Connection Re-establishment on MCG, UE reconfigure SRB1 to sends RRC Connection Re-establishment Request message to the selected cell (e.g. the neighbour cell), and if the UE successfully sends the RRC Connection Re-establishment Request, the UE stops the T311 timer and UE start T301 timer. The UE receives RRC Connection Re-establishment message from the selected cell. After configuration following the message, the UE sends complete message and also sends resume indication to suspended SCG for resuming all SCG DRBs and SCG transmission for split (S1011).

If the UE successfully receives the RRC Connection Re-establishment, UE stops the T301 timer for RRC Connection Re-establishment on MCG.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 11 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a user equipment (UE) operating in a wireless communication system, the method comprising:
   receiving a cell list from a secondary node;
   detecting radio link failure on a master node, wherein the UE is configured with the master node and the secondary node simultaneously;
   transmitting a first message indicating suspension of secondary cells to the secondary node without releasing the secondary cells;

selecting a cell which is to be a Primary Cell (PCell) on a new master node;

initiating a Radio Resource Control (RRC) connection re-establishment procedure with the new master node for recovery from the radio link failure of the master node; and transmitting a second message indicating resumption of the suspended secondary cells to the secondary node, wherein based on the selected cell being on the cell list, the UE suspends all secondary cells of the secondary node during the RRC connection re-establishment procedure.

2. The method according to claim 1, wherein the cell list includes cell information that supports a Secondary Cell Group (SCG) configuration that is the same as a SCG configuration of the master node on which the radio link failure is detected.

3. The method according to claim 1, wherein the cell list is received through on-demand or broadcast system information, or RRC dedicated signal messages.

4. The method according to claim 1, wherein the suspension of all secondary cells of the secondary node includes suspending all SCG Data Radio Bearers (DRBs) and SCG transmission of split DRBs except SCG Signaling Radio Bearer0 (SRB0).

5. The method according to claim 1, wherein the UE transmits the second message based on the RRC connection reestablishment procedure being successfully completed.

6. The method according to claim 1, further comprising:
releasing all of the secondary cells of the secondary node based on the selected cell not being any of the cells on the cell list.

7. The method according to claim 1, wherein the master node is an LTE network node and the secondary node is an NG-Radio Access Network (RAN) node.

8. A user equipment (UE) operating in a wireless communication system, the UE comprising:
a transceiver; and
a processor operably coupled with the transceiver and configured to:
receive a cell list from a secondary node;
detect radio link failure on a master node, wherein the UE is configured with the master node and the secondary node simultaneously;
transmitting a first message indicating suspension of secondary cells to the secondary node without releasing the secondary cells;
select a cell which is to be a Primary Cell (PCell) on a new master node;
initiate a Radio Resource Control (RRC) connection re-establishment procedure with the new master node for recovery from the radio link failure of the master node; and
transmitting a second message indicating resumption of the suspended secondary cells to the secondary node;
wherein based on the selected cell being on the cell list, the UE suspends all secondary cells of the secondary node during the RRC connection re-establishment procedure.

9. The UE according to claim 8, wherein the cell list includes cell information that supports a Secondary Cell Group (SCG) configuration that is the same as a SCG configuration of the master node on which the radio link failure is detected.

10. The UE according to claim 8, wherein the cell list is received through on-demand or broadcast system information, or RRC dedicated signal messages.

11. The UE according to claim 8, wherein the suspension of all secondary cells of the secondary node includes suspending all SCG Data Radio Bearers (DRBs) and SCG transmission of split DRBs except SCG Signaling Radio Bearer0 (SRB0).

12. The UE according to claim 8, wherein the UE transmits the second message based on the RRC connection reestablishment procedure being successfully completed.

13. The UE according to claim 8, wherein the processor is further configured to:
release all of the secondary cells of the secondary node based on the selected cell not being any of cells on the cell list.

14. The UE according to claim 8, wherein the master node is an LTE network node and the secondary node is an NG-Radio Access Network (RAN) node.

* * * * *